(12) United States Patent
Kim (10) Patent No.: US 8,169,579 B2
(45) Date of Patent: May 1, 2012

(54) LIQUID CRYSTAL DISPLAY (75) Inventor: Dong-Gyu Kim, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 349 days.

(21) Appl. No.: 12/372,171

(22) Filed: Feb. 17, 2009

(65) Prior Publication Data

US 2009/0207366 A1 Aug. 20, 2009

(30) Foreign Application Priority Data

Feb. 18, 2008 (KR) .......................... 10-2008-0014463

(51) Int. Cl.
*G02F 1/1343* (2006.01)
(52) U.S. Cl. ........................................... 349/141
(58) Field of Classification Search ................... None
See application file for complete search history.

(56) References Cited

U.S. PATENT DOCUMENTS

| | | | |
|---|---|---|---|
| 6,459,464 B1 * | 10/2002 | Nakasima et al. | 349/141 |
| 7,095,471 B2 * | 8/2006 | Wu | 349/141 |
| 2004/0212761 A1 * | 10/2004 | Kadotani et al. | 349/110 |
| 2005/0280753 A1 * | 12/2005 | Kobayashi | 349/106 |
| 2007/0002251 A1 * | 1/2007 | Chang et al. | 349/141 |
| 2010/0265447 A1 * | 10/2010 | Seo et al. | 349/141 |

FOREIGN PATENT DOCUMENTS

| | | |
|---|---|---|
| JP | 2006-337625 | 12/2006 |
| KR | 10-2005-0030788 | 3/2005 |
| KR | 10-0658072 | 12/2006 |

* cited by examiner

*Primary Examiner* — Thanh-Nhan P. Nguyen
(74) *Attorney, Agent, or Firm* — Innovation Counsel LLP (57) ABSTRACT

A liquid crystal display (LCD) has pixels with large effective aperture ratios. The LCD includes: a first insulating film formed over the gate line and the common electrode; a data line formed over the first insulating film, the data line crossing over the gate line, the data line being bent in a zigzag manner; a second insulating film formed over the data line; a pixel electrode formed over the second insulating film and comprising a plurality of subpixel electrodes substantially parallel to the data line, the pixel electrode comprising a connecting electrode interconnecting the subpixel electrodes; a shielding electrode formed over the second insulating film to overlie the data line; and a liquid crystal layer.

20 Claims, 7 Drawing Sheets

LIQUID CRYSTAL DISPLAY

This application claims priority from South Korean Patent Application No. 10-2008-0014463 filed on Feb. 18, 2008 in the Korean Intellectual Property Office, the disclosure of which is incorporated herein by reference in its entirety.

BACKGROUND OF THE INVENTION

1. Field of the Invention

The present invention relates to a liquid crystal display (LCD), and more particularly, to an LCD whose pixels have increased effective aperture ratios and thus improved light transmission.

2. Description of the Related Art

Liquid crystal displays (LCDs) are among the most widely used types of flat panel displays (FPDs). An LCD includes a liquid crystal layer between two substrates with electrodes. The LCD rearranges the molecules of the liquid crystal layer by applying voltages to the electrodes to control the amount of light transmitted through the liquid crystal layer to display a desired image.

LCDs can be easily made thin and can consume relatively little power and generate hardly any electromagnetic emission dangerous to humans. However, their lateral visibility is poorer than front visibility. To overcome this drawback, various proposals have been being made as to arranging liquid crystal molecules and driving the LCD. These proposals include patterned vertical alignment (PVA) mode LCDs which are vertical alignment (VA) mode LCDs having slits for domain partition, and in-plane switching (IPS) mode LCDs which employ transversal fields.

However, PVA mode LCDs frequently exhibit texture or afterimages and are limited with regard to a wide viewing angle. As to the IPS mode LCDs, such LCDs have a relatively low luminance since their common electrode reduces the aperture ratio. Thus, IPS mode LCDs require a high-luminance backlight.

Plane-to-line switching (PLS) mode LCDs, which employ the transversal field method like IPS mode LCDs, are drawing attention since they can have a wide viewing angle and a high luminance. However, in a PLS mode LCD, the liquid crystal orientation in a region around a pixel cannot be controlled due to the lateral field associated with the data line. This region can be shielded out by a black patch, but this reduces the LCD luminance.

SUMMARY

This section summarizes some features of the present disclosure of invention. Other features are described in subsequent sections. The disclosure includes the appended claims, which are incorporated into this section by reference.

Some embodiments provide LCDs which control the liquid crystal orientation in regions around pixels, including regions adjacent to the data lines, to suppress texture and increase the effective aperture ratio.

According to one aspect of the invention, a liquid crystal display (LCD) comprises: a first insulating substrate; a gate line formed over the first insulating substrate; a common electrode insulated from the gate line; a first insulating film formed over the gate line and the common electrode; a data line formed over the first insulating film, the data line crossing over the gate line, the data line being bent in a zigzag manner; a second insulating film formed over the data line; a pixel electrode formed over the second insulating film and comprising a plurality of subpixel electrodes substantially parallel to the data line, the pixel electrode comprising a connecting electrode interconnecting the subpixel electrodes; a shielding electrode formed over the second insulating film to overlie the data line; a second insulating substrate which faces the first insulating substrate; and a liquid crystal layer interposed between the first insulating substrate and the second insulating substrate.

Other aspects and features of the present disclosure invention are described below.

DESCRIPTION OF SOME EMBODIMENTS

The embodiments described in this section are provided for illustration and do not limit the invention.

It will be understood that when an element or layer is referred to as being "on" another element, then intervening elements may be present. In contrast, when an element is referred to as being "directly on" another element, then there are no intervening elements. Like numbers refer to like elements throughout. As used herein, the term "and/or" includes any and all combinations of one or more of the associated listed items.

Spatially relative terms such as "below," "beneath", "lower", "above", "upper", and the like, may be used herein to describe relationships between different elements as illustrated in the figures. The invention is not limited however to the spacial orientation depicted in the figures.

Figure 1:
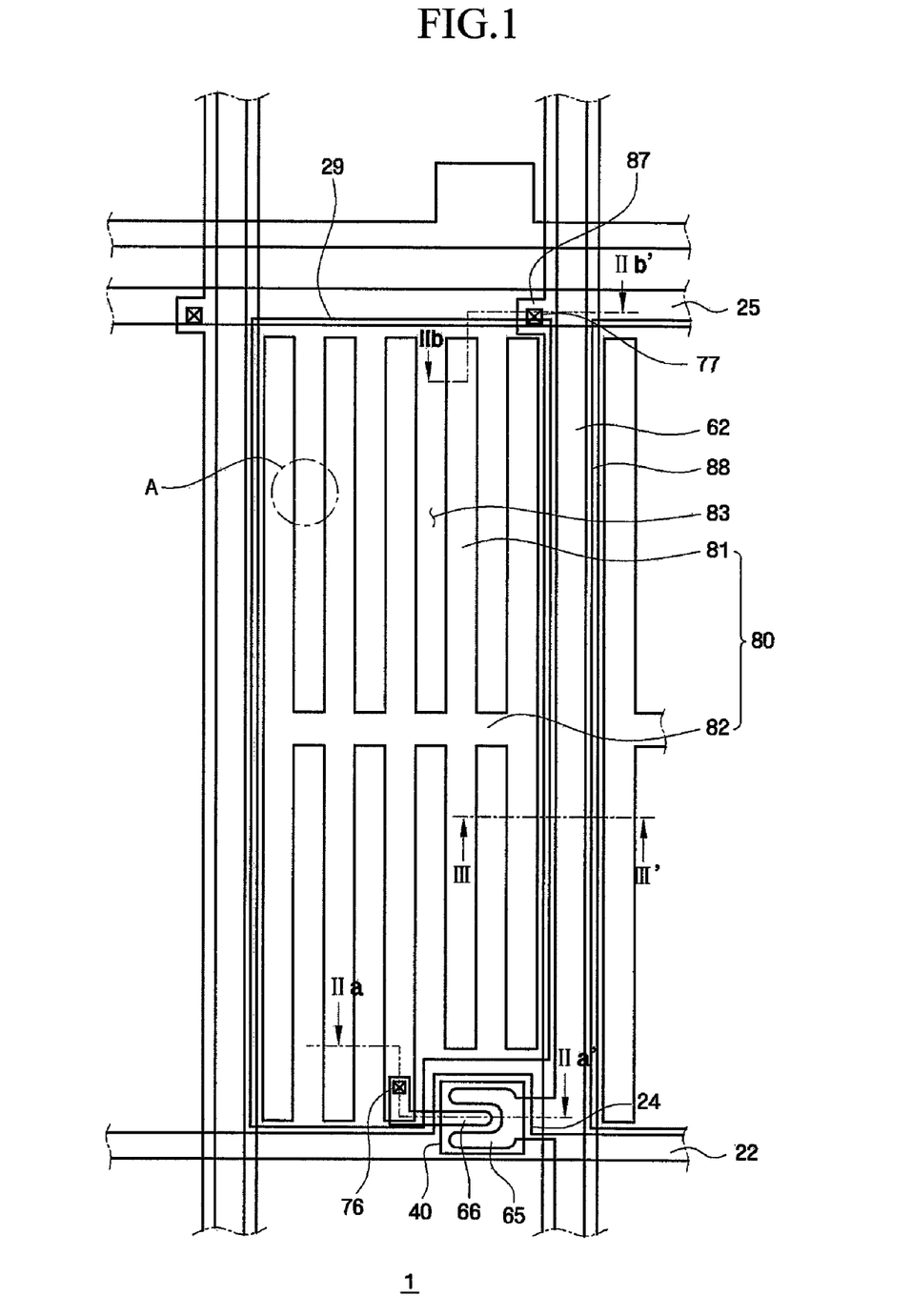
FIG. 1 is a layout view of a thin-film transistor (TFT) display panel of an LCD according to an exemplary embodiment of the present invention.
Figure 2A:
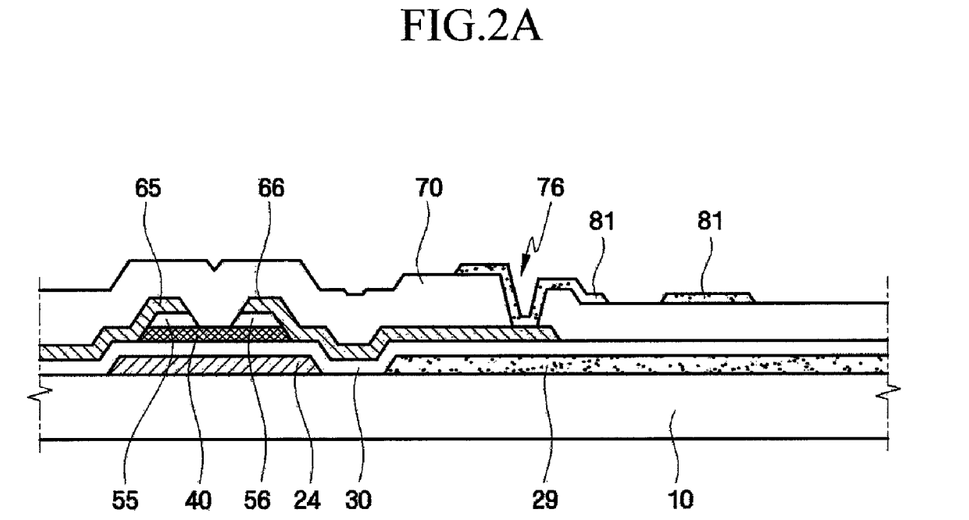
FIG. 2A is a cross-sectional view of the TFT display panel taken along a line IIa-IIa' of FIG. 1.
Figure 2B:
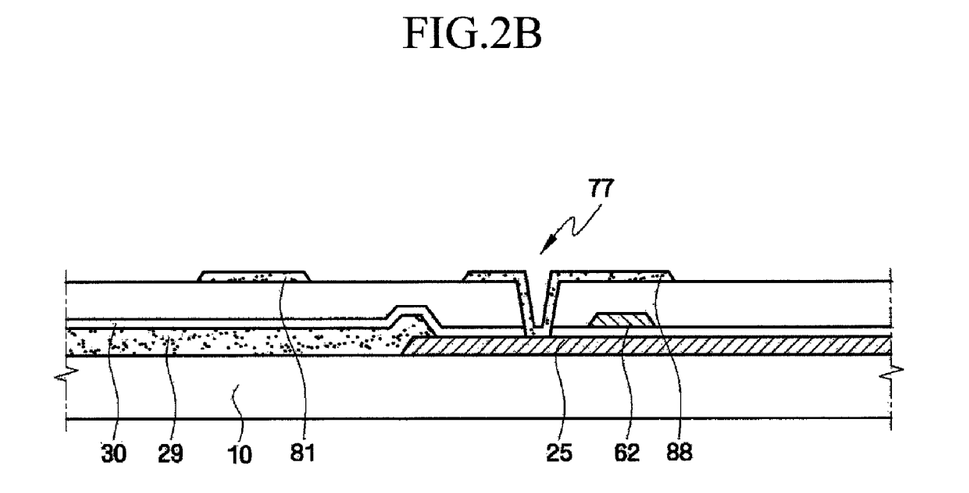
FIG. 2B is a cross-sectional view of the TFT display panel taken along a line IIb-IIb' of FIG. 1.
Figure 3:
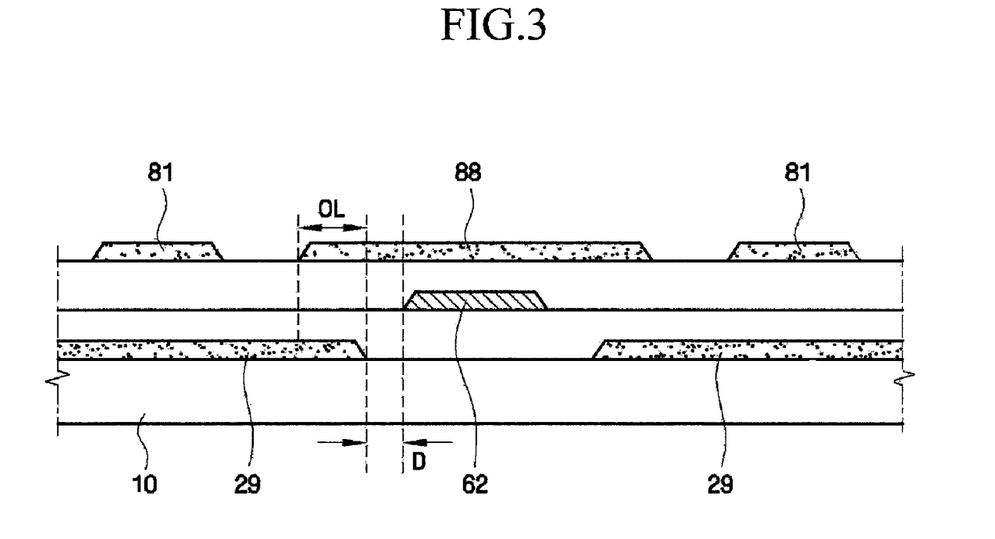
FIG. 3 is a cross-sectional view of the TFT display panel taken along a line III-III' of FIG. 1.
Figure 4:
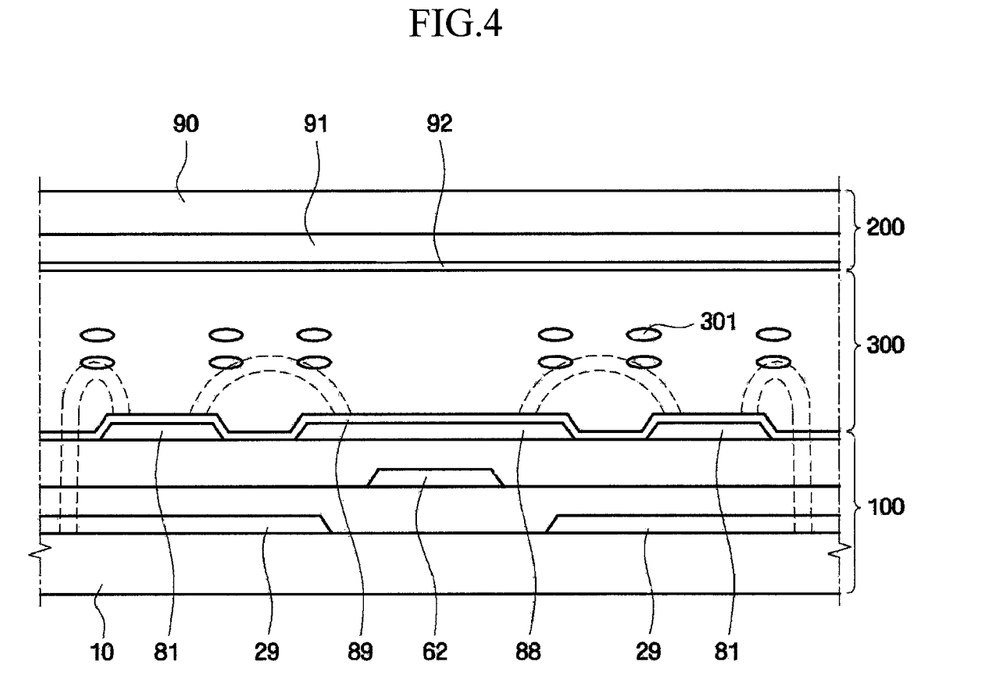
FIG. 4 is a schematic cross-sectional view of the LCD shown in FIG. 1.

FIGS. 1 to 4 illustrate a liquid crystal display (LCD) according to an exemplary embodiment of the present invention. FIG. 1 is a layout view of a thin-film transistor (TFT) display panel 100 of the LCD 1 according to this embodiment. FIG. 2A is a cross-sectional view of the TFT display panel 100 taken along a line IIa-IIa' in FIG. 1. FIG. 2B is a cross-sectional view of the TFT display panel 100 taken along a line IIb-IIb' in FIG. 1. FIG. 3 is a cross-sectional view of the TFT display panel 100 taken along a line III-III' in FIG. 1. FIG. 4 is a schematic cross-sectional view of the LCD 1.

The LCD 1 includes the TFT display panel 100, a common electrode display panel 200 (see FIG. 4), and a liquid crystal layer interposed between the TFT display panel 100 and the common electrode display panel 200. The TFT display panel 100 includes a TFT array, and the common electrode display panel 200 faces the TFT display panel 100 and is separated from the TFT display panel 100 by a predetermined distance to maintain a cell gap.

Referring to FIGS. 1 through 3, gate lines 22 are formed on a first insulating substrate 10 which is made of transparent glass or plastic. The gate lines 22 generally extend in a horizontal direction and deliver gate signals. A row of pixels is associated with one gate line 22. Each gate line 22 has protruding gate electrodes 24. The gate lines 22 and the gate electrode 24 are collectively referred to as gate wiring.

The gate wiring may be made of an aluminum (Al)-based metal (i.e. aluminum or its alloys), a silver (Ag)-based metal (i.e. silver or its alloys), a copper (Cu)-based metal (i.e. copper or its alloys), a molybdenum (Mo)-based metal (i.e. molybdenum or its alloys), chrome (Cr), titanium (Ti), or tantalum (Ta).

The gate wiring may have a multi-layer structure composed of two conductive layers (not shown) with different physical characteristics. In this case, one of the two conductive layers may be made of a metal with low resistivity, such as an Al-based metal, a Ag-based metal or a Cu-based metal, in order to reduce signal delays and/or voltage drops along gate wiring lines. The other one of the conductive layers may be made of a different material having good adhesion characteristics for adhesion with indium tin oxide (ITO) and/or indium zinc oxide (IZO). Suitable materials include Mo-based metals, chromium, titanium, and tantalum. Suitable examples of the multi-layer structure include a combination of chromium as a lower layer and aluminum as an upper layer, and a combination of aluminum as a lower layer and molybdenum as an upper layer. These examples do not limit the invention, and other metals and conductive materials can also be used.

Common electrode lines 25 deliver a common voltage to common electrodes 29. Each common electrode line 25 is adjacent to the corresponding gate line 22. The common electrode lines 25 extend in the horizontal direction in parallel to the gate lines 22. The common electrode lines 25 may be formed of the same layer as the gate lines 22, and whether or not the common electrode lines 25 and the gate lines 22 are formed of the same layer they may be formed of the same material, e.g. Al, Cu, Ag, Mo, Cr, Ti, Ta or their alloys.

In each pixel, the common electrode 29 together with the pixel electrode 80 generates an electric field in the liquid crystal layer to position liquid crystal molecules for display of a desired image. The common electrodes 29 are formed over the first insulating substrate 10. In each row of pixels, the common electrodes 29 are connected to the corresponding common electrode line 25 which provides the common voltage to the common electrodes 29. One common electrode 29 is provided in each pixel defined by a gate line 22 and a data line 62. The common electrodes 29 are substantially rectangular, and are arranged in a matrix. Each common electrode 29 occupies a major proportion of the corresponding pixel region defined by the gate line 22 and the data line 62. The common electrodes 29 are made of a transparent conductive material such as ITO or IZO. The common electrode 29 may be formed of the same layer as the common electrode lines 25. In this case, each common electrode 29 may include an interconnect branch connected to the corresponding common electrode line 25. Alternatively, the common electrodes 29 may be formed from a different layer than the common electrode lines 25, and the common electrodes 29 may overlap the corresponding common electrode lines 25 and may physically contact the corresponding common electrode lines 25 in the overlap regions (see FIG. 2B). Each common electrode 29 is overlapped with a shielding electrode 88 (described below) by a predetermined length OL (FIG. 3), and is separated from the corresponding data line 62 by a predetermined distance D.

A gate insulating film 30, which is made of silicon nitride ($Si_xN_y$) or silicon oxide (SiOx), is formed over the gate lines 22, the common electrode lines 25, and the common electrodes 29. The gate insulating film 30 insulates the gate lines 22 from the adjacent common electrodes 29 and also insulates the gate lines 22 and the common electrodes 29 from overlying conductive features such as the data lines 62.

A semiconductor layer 40, of hydrogenated amorphous silicon, is formed over the gate insulating film 30. The semiconductor layer 40 at least partially covers the gate electrodes 24. The semiconductor layer 40 may be patterned into a number of islands, with one island in each pixel. Alternatively, the semiconductor layer 40 may be patterned into a number of straight strips or in some other way. In each pixel, the semiconductor layer 40, the underlying gate electrode 24, and the overlying source and drain electrodes 65 and 66 form a TFT. The semiconductor layer 40 functions as the TFT's channel.

Ohmic contact features 55 and 56 are formed on the semiconductor layer 40 to reduce contact resistance between the overlying source and drain electrodes 65 and 66 and the underlying semiconductor layer 40. The ohmic contact features 55 and 56 can be made, for example, of a layer of n+ hydrogenated amorphous silicon heavily doped with n-type impurities to provide low resistance.

The ohmic contact features 55 and 56 may be patterned together with the semiconductor layer 40.

As shown in FIG. 2, in each pixel the ohmic contact features 55 and 56 can be spaced from each other so that the ohmic contact feature 55 underlies the source electrode 65 while the ohmic contact feature 56 underlies the drain electrode 66.

The data lines 62, the source electrodes 65 which extend from the data lines 62, and the drain electrodes 66 spaced from the source electrodes 65 are formed over the gate insulating film 30 and the ohmic contact features 55 and 56.

The data lines 62 deliver data signals and generally extend in a vertical direction and cross over the gate lines 22. A pixel is formed at each intersection of a data line 62 with a gate line 22. The data lines 62, the source electrodes 65, and the drain electrodes 66 are collectively referred to as data wiring.

The data wiring may be made of chromium, or of molybdenum-based metal, or of a refractory metal such as Ta and Ti. Alternatively, the data wiring may have a multi-layer structure composed of a lower layer (not shown) of a refractory metal and an upper layer (not shown) made of a material with low resistivity. Other multi-layer structures with or without refractory metals may also be used. Suitable multi-layer structures include a combination of a chromium lower layer and an aluminum upper layer and a combination of an aluminum lower layer and a molybdenum upper layer. A triple-layer structure of molybdenum-aluminum-molybdenum can also be used, and other multi-layer structures are possible.

In each pixel, at least part of each of the source electrode 65 and the drain electrode 66 overlies the semiconductor layer 40. The drain electrode 66 faces the source electrode 65, and they are positioned over different portions of the gate electrode 24. The ohmic contact features 55 and 56 described above are interposed between the underlying semiconductor layer 40 and the overlying source electrode 65 and drain electrode 66. Thus, the ohmic contact features 55 and 56 reduce contact resistance between the semiconductor layer 40 on one hand and the source and drain electrodes 65 and 66 on the other hand.

A passivation layer 70 is formed over the data wiring and the semiconductor layer 40. The passivation layer 70 is made of an inorganic material such as silicon nitride or silicon oxide, or a photosensitive organic material having superior planarization characteristics, or a low-k dielectric material formed by plasma enhanced chemical vapor deposition (PECVD), such as amorphous Si:C:O or amorphous Si:O:F. The passivation layer 70 may be made of a dielectric with a relative dielectric constant of less than 4 in order to reduce the capacitance between the data lines 62 and the adjacent shielding electrodes 88. In this case, the thickness of the passivation layer 70 may be 0.6 to 1 µm.

The passivation layer 70 may be composed of a lower inorganic layer and an upper organic layer in order to protect those portions of the semiconductor layer 40 which physically contact the passivation layer 70 and, at the same time, to take advantage of the superior characteristics of the organic layer. Furthermore, red (R), green (G) or blue (B) color filters layer may be used as the passivation layer 70.

A contact hole 76 is formed in the passivation layer 70 in each pixel. In each pixel, the pixel electrode 80 physically and electrically contacts the drain electrode 66 through the contact hole 76. The pixel electrode 80 thus receives data voltages and control voltages through the drain electrode 66.

In each pixel, the voltage difference between the data voltage on the pixel electrode 80 and the underlying common electrode 29 provides an electric field which rotates liquid crystal molecules into a desired position. The pixel electrodes 80 are made of a conductive material such as ITO or IZO. Each pixel electrode 80 includes a plurality of subpixel electrodes 81, shaped like stripes, and also includes a connecting electrode 82. The subpixel electrodes 81 are separated from each other by slits 83 of a predetermined width. The subpixel electrodes 81 are physically and electrically interconnected by the connecting electrode 82.

The subpixel electrodes 81 occupy a large part of the pixel electrode 80, and liquid crystal molecules are usually rotated by the electric field between the subpixel electrodes 81 and the common electrode 29. The subpixel electrodes 81 run parallel to the corresponding data line 62. The subpixel electrodes 81 may be sloped at a predetermined angle with respect to the data line 62 to define the direction of motion of the liquid crystal molecules when the horizontal electric field is generated.

Specifically, the subpixel electrodes 81 may be positioned at a predetermined angle with respect to the alignment direction of an alignment film formed over the pixel electrodes 80. Suppose for example that the liquid crystal has positive dielectric anisotropy. The alignment film causes the liquid crystal molecules to be initially positioned in the alignment direction and thus at a predetermined angle with respect to the subsequently induced horizontal electric field. When a voltage is applied to the subpixel electrodes 81 to induce this electric field, this field is directed from the subpixel electrodes 81 toward the underlying common electrode 29. When viewed from the top, the electric field is perpendicular to the sides of the subpixel electrodes 81. If the alignment direction is at angle greater than −90° and less than 90° with respect to the electric field, then the direction of rotation of the liquid crystal molecules from the initial position to the position defined by the electric field is not random but is defined by the angle between the alignment direction and the electric field. Consequently, texture can be prevented, and the response time can be reduced.

The connecting electrode 82 interconnects the subpixel electrodes 81 and is formed in the middle between the subpixel electrodes 81 and in parallel to the gate lines 22. The connecting electrode 82 may be formed anywhere as long as it interconnects the subpixel electrodes 81. In order to reduce the voltage variations across the subpixel electrodes 81, it is desirable for the connecting electrode 82 to be connected to each subpixel electrode 81 as in FIG. 1.

In each pixel, the shielding electrode 88 is formed above the corresponding data line 62 to suppress texture generation between the subpixel electrodes 81 of the pixel electrode 80 on the one hand and the data line 62 on the other hand. The movement of liquid crystal molecules is affected by the lateral field between the subpixel electrodes 81 of the pixel electrode 80 on the one hand and the data line 62 on the other hand. Specifically, liquid crystal molecules are controlled by the electric field which is generated between the pixel electrode 80 and the common electrode 29. The common electrode 29 is at a constant common voltage, and the pixel electrode 80 is at a data voltage provided to the pixel and determined based on the desired image to be displayed at the pixel. However, the liquid crystal molecules near the data line 62 are affected not only by the pixel electrode 80 and the common electrode 29 but also by the lateral field generated between the pixel electrode 80 and the data line 62. The data line 62 may successively carry different data voltages to different pixels. Thus, the lateral field between the pixel electrode 80 and the data line 62 impedes control over the position of liquid crystal molecules, thereby creating texture.

The shielding electrode 88 helps suppress the effect of the lateral field between the pixel electrode 80 and the data line 62. The effect of the lateral field is reduced by the electric field between the pixel electrode 80 and the shielding electrode 88. This latter field is coordinated with the pixel voltage as explained below to effectively control liquid crystal molecules around the data line 62.

The shielding electrode 88 is disposed above the data line 62. The shielding electrode 88 may be formed of the same layer and the same material as the pixel electrode 80. The shielding electrode 88 may completely cross over the data line 62 and may overlap with the common electrode 29 of an adjacent pixel. An exemplary value for the length OL by which the shielding electrode 88 overlaps the common electrode 29 may be 0.5 to 4 µm.

The shielding electrode 88 includes a wide connecting portion 87 extending from the main body of the shielding electrode 88 to overlap the common electrode line 25. The connecting portion 87 is connected to the common electrode line 25 through a contact hole 77 and receives a common voltage from the common electrode line 25. The connecting portion 87 may overlap and be connected to any one or both of the common electrode line 25 and the common electrode 29, and may have any suitable geometry.

Since the electric field generated by the shielding electrode 88 and the pixel electrode 80 is similar to that generated by the common electrode 29 and the pixel electrode 80, the liquid crystal molecules' orientation is substantially uniform throughout the pixel region including the region near the data line 62, significantly reducing the creation of texture.

Figure 5:
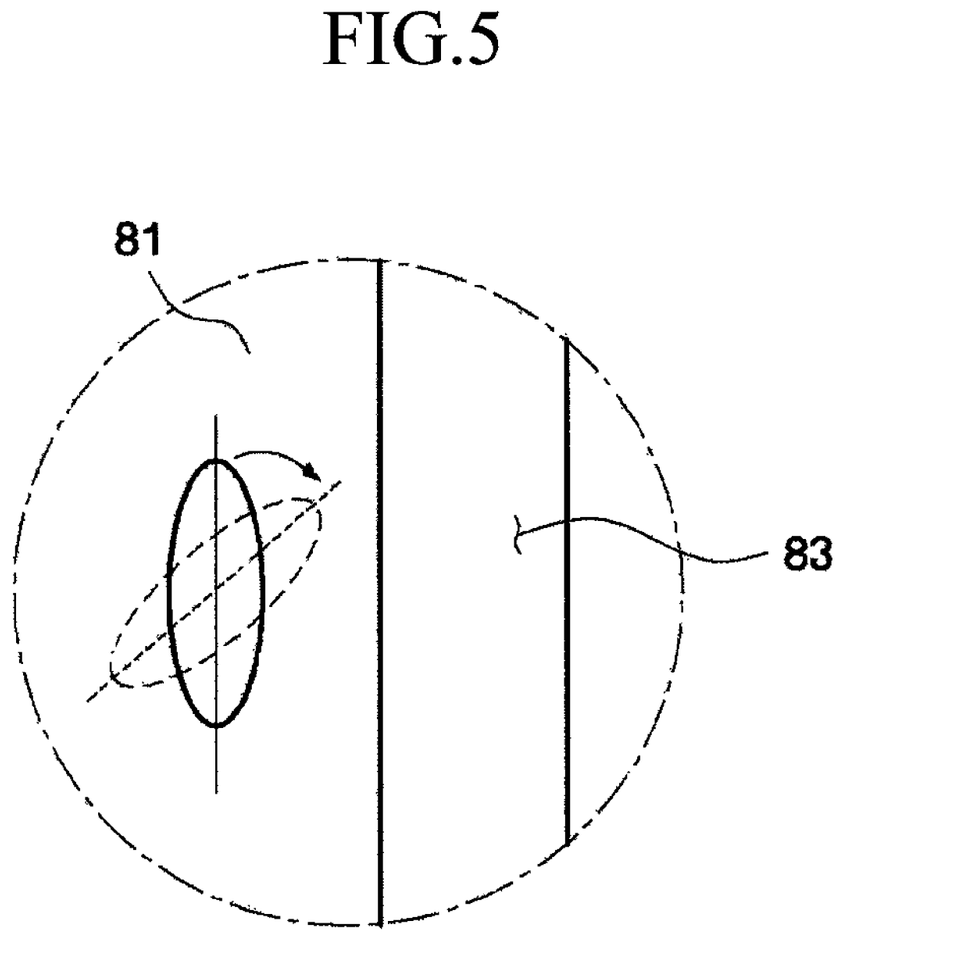
FIG. 5 is an enlarged view of a region 'A' shown in FIG. 1.

The movement of liquid crystal molecules between the pixel electrode 80 and the common electrode 29 and between the pixel electrode 80 and the shielding electrode 88 will be described below with reference to FIGS. 4 and 5. FIG. 4 is a schematic cross-sectional view of the LCD 1 shown in FIG. 1. FIG. 5 is an enlarged view of a region 'A' shown in FIG. 1.

FIG. 4 shows the TFT display panel 100 having a first alignment film 89, e.g. polyimide, formed over the common electrodes 29, the gate insulating film 30, the passivation layer 70, the pixel electrodes 80 and the shielding electrodes 88 which in turn are formed over the first insulating substrate 10.

FIG. 4 also shows the common electrode display panel 200 including color filters 91 and a second alignment film 92, which is made of polyimide for example. The color filters 91 and the second alignment film 92 underlie a second insulating substrate 90 made of transparent glass or plastic. A liquid crystal layer 300, which includes liquid crystal molecules 301 having positive dielectric anisotropy, is interposed between the respective first and second alignment films 89 and 92 of the TFT display panel 100 and the common electrode display panel 200. The first and second alignment films 89 and 92 provide alignment perpendicular to the gate lines 22.

Referring to FIG. 4, if a data voltage is applied to the pixel electrode 80 of some pixel and a common voltage is applied to the pixel's common electrode 29 and the shielding electrode 88, then electric fields are formed between the pixel electrode 80 and the common electrode 29 and between the pixel electrode 80 and the shielding electrode 88. These electric fields generate a torque that rotates the liquid crystal molecules 301 (having positive dielectric anisotropy) towards alignment with the electric fields. The torque acting on each liquid crystal molecule 301 is proportional to the intensity of the electric field in which the molecule is positioned, i.e. to the electric field between the pixel electrode 80 and the common electrode 29 or the electric field between the pixel electrode 80 and the shielding electrode 88.

The final angular orientation of each liquid crystal molecule 301 is the position in which the torque generated by the electric field is balanced by the torque due to an elastic restoring force which acts to position the liquid crystal molecules 301 in the alignment direction defined by the alignment films. The rotation angle of the liquid crystal molecules 301 may be adjusted by adjusting the intensity of each electric field, thus controlling the light transmission of each pixel. Since the voltage difference between the pixel electrode 80 and the common electrode 29 is the same as between the pixel electrode 80 and the shielding electrode 88, the liquid crystal molecules 301 in the electric field formed between the pixel electrode 80 and the common electrode 29 have about the same angular orientation as the liquid crystal molecules 301 in the electric field formed between the pixel electrode 80 and the shielding electrode 88. The movement of the liquid crystal molecules near the data line 62 can therefore be effectively controlled.

As shown in FIG. 4, when a voltage is applied to the pixel electrode 80, an electric field is formed between the subpixel electrodes 81 and the underlying common electrode 29. Since the subpixel electrodes 81 are substantially parallel to each other with the slits 83 interposed therebetween, the electric field is on the whole perpendicular to the subpixel electrodes 81. Accordingly, the liquid crystal molecules 301 rotate in the direction of the electric field from the direction in which they were initially aligned until reaching a region where the torque of the liquid crystal molecules 301 generated by the electric field and the torque due to the elastic force of restitution are in equilibrium.

Figure 6:
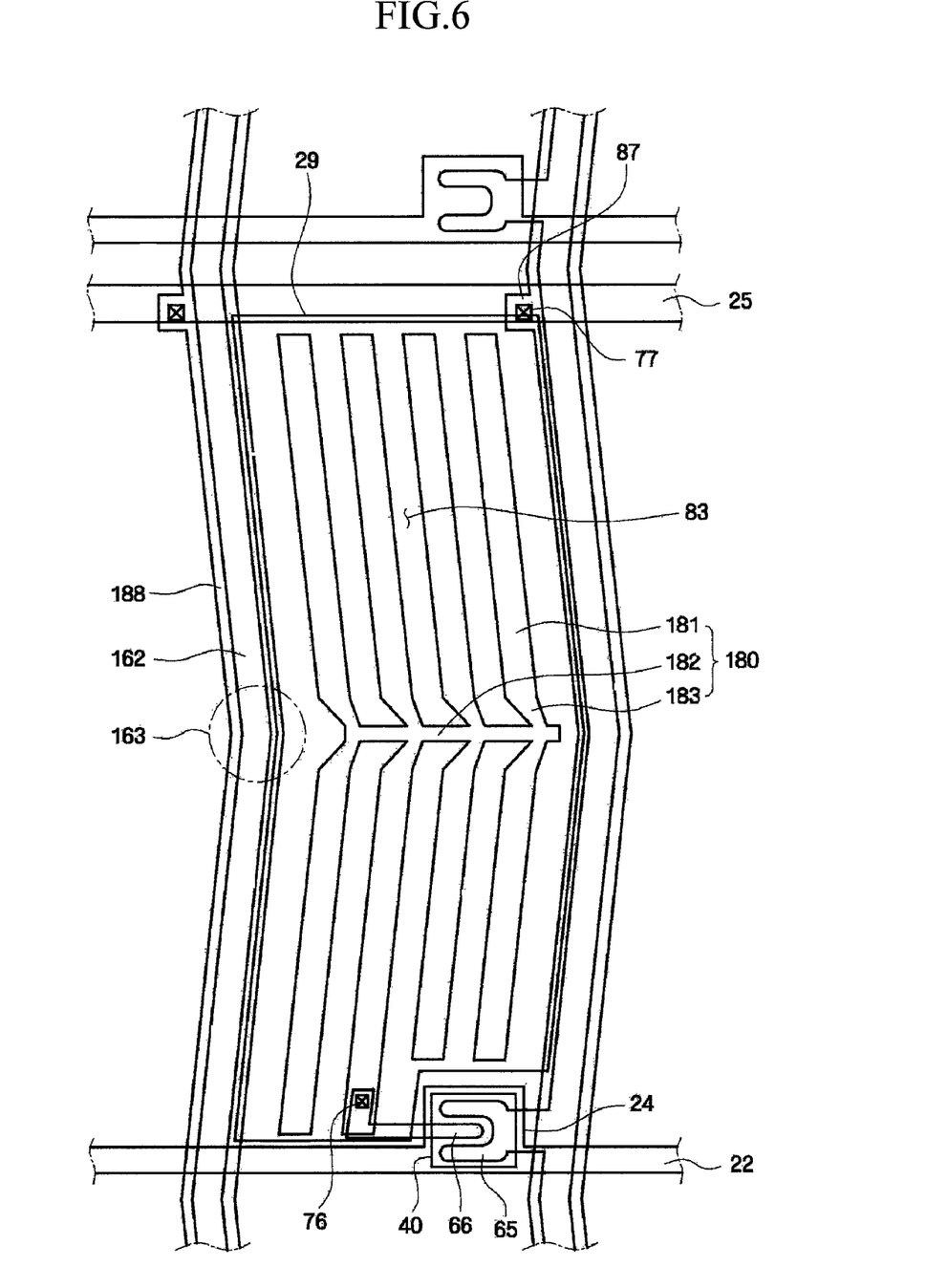
FIG. 6 is a layout view of a TFT display panel of an LCD according to another exemplary embodiment of the present invention.

Now an LCD according to another exemplary embodiment of the present invention will be described. FIG. 6 is a layout view of a TFT display panel of this LCD.

In the LCD of FIG. 6, each data line 162 includes a bent portion 163. Each pixel electrode 180 includes subpixel electrodes 181 parallel to the respective straight segments of the date line 162 above or below the bent portion 163.

Like the LCD of FIGS. 1-5, the LCD of FIG. 6 includes gate lines 22, common electrode lines 25, and common electrodes 29 formed over first insulating substrate 10. The gate lines 22 generally extend in the horizontal direction, and the common electrode lines 25 are parallel to the gate lines 22. In each pixel, the common electrode 29 is electrically connected to the common electrode line 25.

A gate insulating film 30 is formed over the gate lines 22, the common electrode lines 25 and the common electrodes 29. The data lines 162 are formed over the gate insulating film 30. The data lines 162 cross over the gate lines 22 and the common electrode lines 25 and may include, at each pixel, the bent portion 163. In the top view of FIG. 6, each data line 162 is bent in a zigzag manner due to the bent portions 163. In each pixel, a shielding electrode 188 overlaps the data line 162.

In each pixel, the pixel electrode 180 includes a plurality of subpixel electrodes 181 parallel to the respective straight segments of the data line 162 above or below the bent portion 163, and also includes a connecting electrode 182 which interconnects the subpixel electrodes 181. The subpixel electrodes 181 are separated from each other by slits 83 interposed therebetween. The subpixel electrodes 181 are parallel to the data line 162 and bent at a position across from the bent portion 163 of the data line 162. The connecting electrode 182 may be adjacent to the bent portion 163 of the data line 162.

Each subpixel electrode 181 may end in an auxiliary connecting electrode 183 connected to the connecting electrode 182. The auxiliary connecting electrodes 183 suppress texture and reduce the bonding angle between the subpixel electrodes 181 and the connecting electrode 182. The auxiliary connecting electrodes 183 are bent portions of the subpixel electrodes 181 at the juncture with the connecting electrode 182. Thus, each subpixel electrode 181 is generally bent at the connecting electrode 182 and is connected to the connecting electrode 182 at the respective auxiliary connecting electrode 183 formed at the bent end of the subpixel electrode 181.

Figure 7:
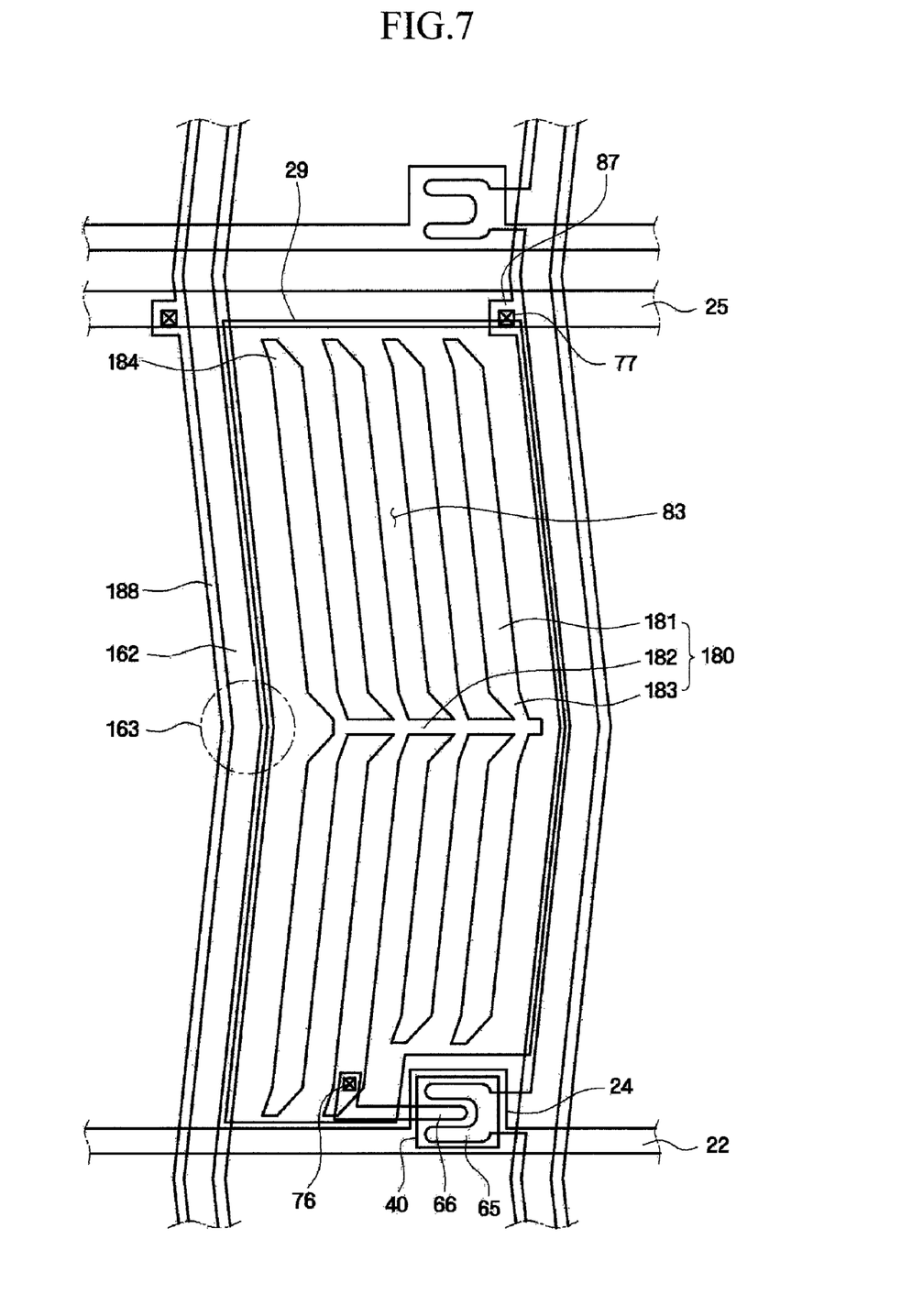
FIG. 7 is a layout view of a TFT display panel of an LCD according to another exemplary embodiment of the present invention.

FIG. 7 is a layout view of an LCD according to another exemplary embodiment of the present invention For simplicity, elements substantially identical to those of the embodiment of FIG. 6 are indicated by like reference numerals and are not described any further.

Referring to FIG. 7, each subpixel electrode 181 includes at one end an auxiliary connecting electrode 183 as in FIG. 6 and also includes, at the opposite end, a bent tip 184 parallel to the auxiliary connecting electrode 183. Thus, each pixel electrode 180 includes the subpixel electrodes 181 and a connecting electrode 182. Each subpixel electrode 181 includes a bent tip 184. The subpixel electrodes 181 are parallel to the corresponding data line 162. The connecting electrode 182 interconnects the subpixel electrodes 181 via the auxiliary connecting electrodes 183. In each subpixel electrode 181, the bent tip 184 is parallel to the auxiliary connecting electrode 183 formed at the opposite end from the bent tip 184.

In each pixel, the bent tips 184 are adjacent to a gate line 22 and are shaped so that the gaps between the adjacent tip ends 184 widen towards the gate line 22. For example, the tip end 184 may have one side slanted at a greater angle to the vertical direction than the data line 62, or may have the other side slanted in the opposite direction from the data line 62.

Each of the tip ends 184 is bent to be parallel to the auxiliary connecting electrodes 183. The slits 83 widen toward the gate line 22 at the location of the tip ends 184. The tip ends 184 are effective in removing dynamic texture and increasing the aperture ratio.

The embodiments described above do not limit the present disclosure of invention, which disclosure is defined by the totality of the filed application.

What is claimed is:
1. A liquid crystal display (LCD) comprising:
a first insulating substrate;
a gate line formed over the first insulating substrate;
a common electrode insulated from the gate line;
a first insulating film formed over the gate line and the common electrode;
a data line formed over the first insulating film, the data line crossing over the gate line, the data line being bent in a zigzag manner;
a second insulating film formed over the data line;

a pixel electrode formed over the second insulating film and comprising a plurality of subpixel electrodes substantially parallel to the data line, the pixel electrode comprising a connecting electrode interconnecting the subpixel electrodes;

a shielding electrode formed over the second insulating film to overlie the data line;

a second insulating substrate which faces the first insulating substrate; and a liquid crystal layer interposed between the first insulating substrate and the second insulating substrate; and wherein at least one end of each of the subpixel electrodes has a side slanted at a greater angle to a direction perpendicular to the gate line than the data line's portion adjacent to said each of the subpixel electrodes.

2. The LCD of claim 1 arranged for the shielding electrode to receive the same voltage as the common electrode.

3. The LCD of claim 1, further comprising a common electrode line formed over the first insulating substrate in parallel to the gate line and connected to the common electrode.

4. The LCD of claim 3, wherein the common electrode line is electrically connected to the shielding electrode.

5. The LCD of claim 4, wherein the common electrode line is connected to the shielding electrode through a contact hole.

6. The LCD of claim 1, wherein the shielding electrode overlaps the common electrode by a predetermined length.

7. The LCD of claim 6, wherein the shielding electrode overlaps a common electrode of a neighboring pixel by a predetermined length.

8. The LCD of claim 7, wherein the predetermined length by which the shielding electrode overlaps the common electrode is 0.5 to 4 µm.

9. The LCD of claim 1, wherein the shielding electrode is made of a material identical to that of the pixel electrode.

10. The LCD of claim 9, wherein the shielding electrode and the pixel electrode are made of indium tin oxide (ITO) or indium zinc oxide (IZO).

11. The LCD of claim 1, wherein a gap between any two adjacent subpixel electrodes widens towards the gate line.

12. The LCD of claim 11, wherein at least two of the subpixel electrodes are substantially symmetrical to each other with respect to the connecting electrode.

13. The LCD of claim 1, wherein a dielectric constant of the second insulating film is four or less.

14. The LCD of claim 1, wherein a thickness of the second insulating film is 0.6 to 1 µm.

15. The LCD of claim 1, wherein the liquid crystal layer comprises liquid crystal molecules having positive dielectric anisotropy.

16. The LCD of claim 15, wherein the liquid crystal molecules are aligned perpendicular to the gate line when no voltage is applied to them.

17. A method for fabricating a liquid crystal display (LCD), the method comprising:

obtaining a first insulating substrate;

providing a gate line formed over the first insulating substrate;

providing a common electrode disposed over the first insulting substrate and insulated from the gate line;

providing a first insulating film formed over the gate line and the common electrode;

providing a data line formed over the first insulating film, the data line crossing over the gate line;

providing a second insulating film formed over the data line;

providing a pixel electrode formed over the second insulating film and comprising a plurality of spaced apart subpixel electrodes extending adjacent to the data line, the pixel electrode comprising a connecting electrode interconnecting the spaced apart subpixel electrodes;

providing a shielding electrode formed over the second insulating film to overlie the data line;

providing a second insulating substrate which faces the first insulating substrate;

providing a liquid crystal layer interposed between the first insulating substrate and the second insulating substrate;

wherein the pixel electrode is overlapped with at least a portion of the common electrode, and wherein another portion of the common electrode is overlapped with a portion of the shielding electrode.

18. The method of claim 17, wherein the shielding electrode completely overlaps the data line.

19. The method of claim 17 wherein the data line is bent in a zigzag manner and the subpixel electrodes extend substantially parallel to the bent data line, but where the subpixel electrodes are not truly parallel to the bent data line but rather bend at an angle greater than a bending angle of the bent data line.

20. The method of claim 17 and further comprising:

not providing a light shielding black patch to cover an area between the data line and an adjacent one of the spaced apart subpixel electrodes.

* * * * *